(62.)

ABNER B. MAGOUN.

Improvement in Window Screens.

No. 4,698. Reissued Jan. 2, 1872.

*Witnesses.*

W. Burris

A. P. Lacey Jr.

*Inventor.*

Abner B. Magoun.

Samuel Sellers.

Pres. Adj. Wire Screen Co.

Assignees.

By Fowler & Buckley.

AM. PHOTO-LITHOGRAPHIC CO. N.Y. (OSBORNE'S PROCESS.)

UNITED STATES PATENT OFFICE.

THE ADJUSTABLE WINDOW-SCREEN COMPANY, OF PHILADELPHIA, PENN., ASSIGNEE, BY MESNE ASSIGNMENTS, OF ABNER B. MAGOUN.

IMPROVEMENT IN WINDOW-SCREENS.

Specification forming part of Letters Patent No. 52,726, dated February 20, 1866; reissue No. 4,698, dated January 2, 1872.

*To all whom it may concern:*

Be it known that ABNER B. MAGOUN, of West Hanover, in the county of Plymouth and State of Massachusetts, did invent an Adjustable Window-Screen; and that the following is a full, clear, and exact description of the same, reference being had to the accompanying drawing making part hereof, in which—

Figure 1:
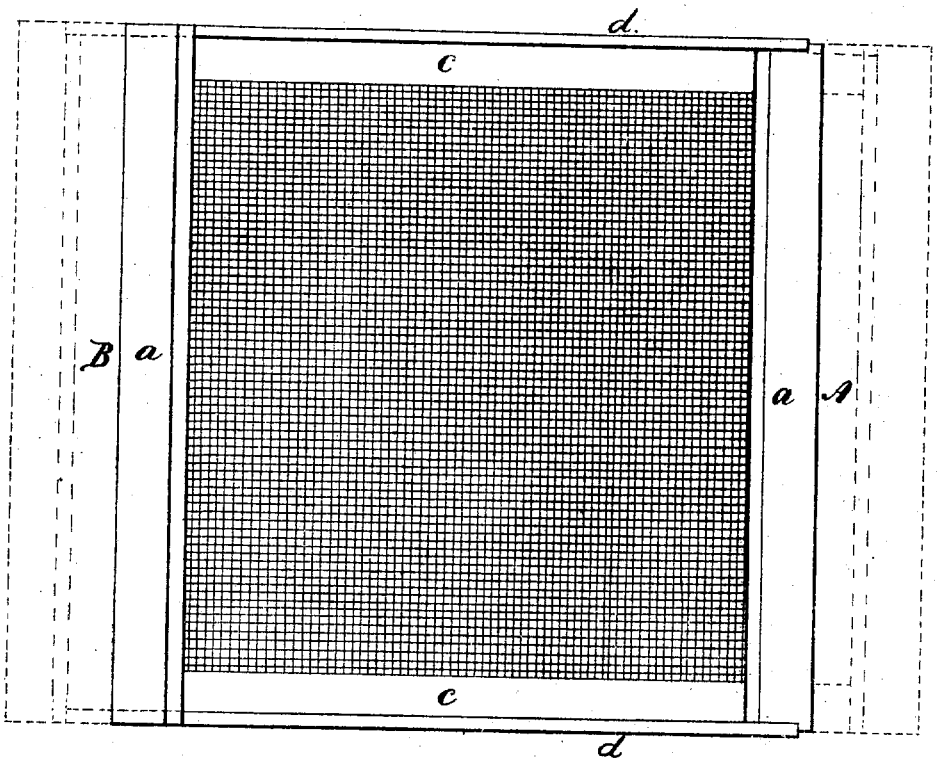
Figure 3:
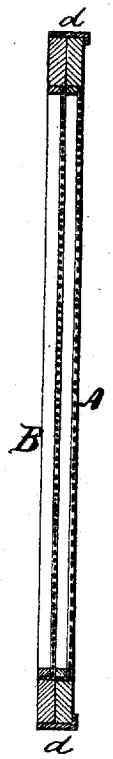
Figure 2:
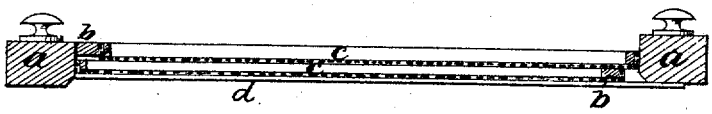

Figure 1 is a front elevation; Fig. 2, a horizontal and transverse section of the same; Fig. 3, a vertical and transverse section.

The nature of the said invention consists of an adjustable window-screen composed of two or more frames, each frame being covered with wire or other gauze and sliding within guides attached to either or both of the frames, being so constructed that each screen when completed can be immediately adjusted to windows of various widths without altering the screen—viz., without adding to or detaching anything from it. The object or purpose of the invention is to permit air or air and light to pass into a room through the screen, and at the same time prevent the entrance of flies and other insects; and its peculiar construction—there being a plurality of sliding gauze-covered frames—admits of its adjustment to almost any window-frame of ordinary width.

In the drawing, A and B are two square or rectangular frames, each being covered with wire or other gauze. Each frame may, if desired, have its outer end bar *a* made thicker than its inner end bar *b;* and I prefer said end bar *a* to be arranged with respect to the latter and the side bars *c c* in the manner shown in the drawing. A metallic guide or thin strip of metal, *d*, bent in section, as shown in Fig. 3, is fastened to the outer edge of each of the side bars *c c* of one of the frames. These guides receive within and between them the side bars of the other frame, and enable the two frames to slide one upon the other, the whole forming an adjustable screen capable of being fitted to window-frames of different widths. The guides above mentioned may be made or applied in any other convenient manner substantially the same as described or shown. As an equivalent they may be attached to both frames. By duplicating or increasing the number of gauze-covered frames, of course the capacity of the screen is increased in that it will answer for very wide windows.

Having thus described the said invention, what is claimed and desired to secure by Letters Patent, is—

A window-screen composed of two complete gauze-covered frames sliding in guides which can be immediately adjusted to windows of various widths without altering the screen, substantially as and for the purpose set forth.

SAMUEL SELLERS,
*Pres. Ad. W. Screen Co.*

Witnesses:
JOHN A. BICKEL,
GEORGE T. TAYLOR.

(62)